Oct. 17, 1961    J. D. NORTH    3,004,749
FLUID-FLOW CONTROL VALVE

Filed June 29, 1959    2 Sheets-Sheet 1

INVENTOR
John D. North
BY Stevens Davis Miller &
Mosher
ATTORNEYS

Oct. 17, 1961   J. D. NORTH   3,004,749
FLUID-FLOW CONTROL VALVE
Filed June 29, 1959   2 Sheets-Sheet 2

INVENTOR
John D. North
BY Stevens Davis Miller &
Mosher

ATTORNEYS

United States Patent Office 3,004,749
Patented Oct. 17, 1961

3,004,749
FLUID-FLOW CONTROL VALVE
John D. North, Bridgnorth, England, assignor to Boulton Paul Aircraft Limited, Codsall, England
Filed June 29, 1959, Ser. No. 823,748
3 Claims. (Cl. 251—309)

This invention relates to fluid-flow control valves of the kind comprising a cylindrical valve member which is movable within a cylindrical housing to control the flow of fluid between ports in the housing. The invention is particularly applicable to valves of this kind in which the valve member is angularly displaced with respect to the housing, in order to control the flow of fluid between the ports. However, the invention is not limited to such application and may be applied to valves in which the valve member is moved rectilinearly in the manner of a plunger.

Difficulties arise in the operation of such valves due to the fact that the static friction which has to be overcome in order to move the valve member from rest is much greater than that necessary to continue such movement when once it has been started.

The present invention aims at avoiding the above disadvantage by reducing the static friction to a minimum.

The invention accordingly provides a fluid-flow control valve comprising a cylindrical valve member movable within a cylindrical housing to control the flow of fluid between ports in the housing, wherein the housing is adapted to provide a plurality of flow paths leading to openings at the inner surface of the housing coacting with the surface of the valve member, said flow paths being constricted so that when they are connected to a source of liquid under pressure, a pressure drop appears in the flow paths between the source of pressure and each opening so long as flow is permitted through the opening, but when the valve is loaded in a direction to tend to close an opening, the flow of liquid is reduced, so reducing the pressure drop and raising the pressure of the liquid at the opening.

Preferably the flow paths are constricted throughout the whole or part of their length, as distinct from having a restricted outlet opening only, so that variations in the pressure drop due to changes in the rate of flow of liquid are substantially proportional to said changes in the rate of flow. Reduction of the rate of flow thereby gives a rapid build up of pressure at the opening.

Preferably the openings are evenly arranged circumferentially of the cylindrical housing and at least two such groups of circumferentially arranged openings are provided one at or near each end of the valve member.

The restricted flow paths can be formed in any convenient manner, for example, by forming narrow radial bores in the housing and/or by connecting lengths of narrow gauge tubing to bores. Thus, lengths of narrow row gauge tubing, such as so-called capillary tubing, can be attached to plugs adapted to be threaded into the outer ends of the radial bores which are appropriately threaded to receive the plugs so that the capillary tubes can be located within the bores.

In a still further modification helical grooves are formed on the outside of the housing and each groove communicates through a radial bore with a corresponding opening in the interior of the housing and a sleeve is shrunk on to the housing so as to cover the helical grooves to provide the restricted flow paths.

An annular channel may be formed in the valve or in the housing between a group of bearing openings and the control ports, said annular channel being connected to an exhaust port so that the pressure of the controlled fluid can be isolated from the pressure of the bearing liquid.

Embodiments of the invention in angularly displaceable liquid-flow control valves will now be described by way of example with reference to the accompanying drawings, in which.

Figure 1:
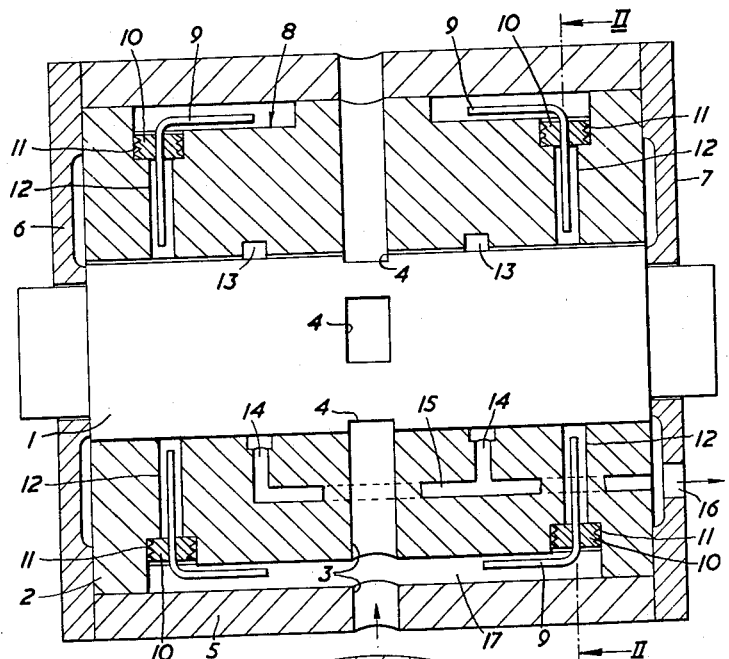
FIG. 1 is a side-sectional elevation of one form of construction of such a liquid-flow control valve according to the invention.
Figure 2:
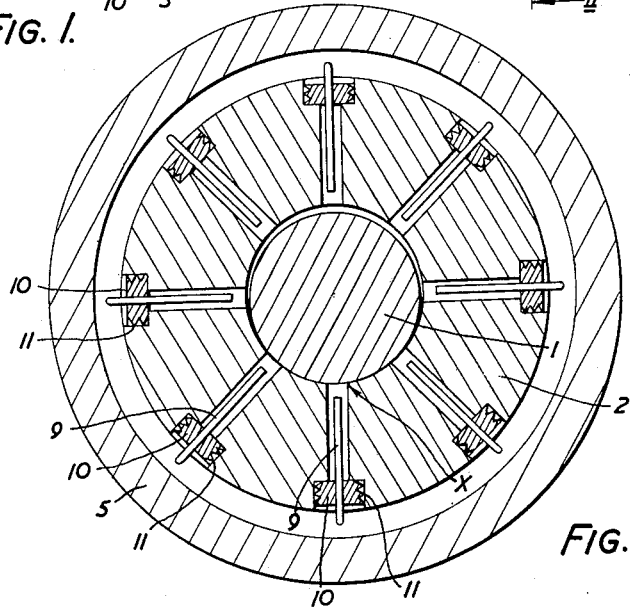
FIG. 2 is a section on the line 2—2 of FIG. 1.

Referring first to FIGS. 1 and 2 of the drawings, a cylindrical valve member 1 is angularly displaceable within a cylindrical housing 2 to control the flow of liquid between a cylindrical housing 2 to control the flow of liquid between ports in the housing. An inlet port 3 is shown in the housing and communicating channels 4 are shown in the valve member 1. The outlet port is not visible in the drawings and it will be understood that one or more inlet ports are arranged to coact with one or more outlet ports according to the kind of liquid flow control to be provided by the valve but the particular arrangement of inlet and outlet ports and communicating channels forms no part of the present invention and need not be described in detail. The housing 2 is arranged within a sleeve 5 between end plates 6 and 7 and is reduced in diameter over a major portion of its length as indicated at 8 so as to provide for the accommodation of capillary tubes 9 carried in plugs 10 screwed into threaded recesses 11 in the housing 2 and extending into radial bores 12 in the housing 2 which bores communicate with the inner face of the housing and hence with the coacting face of the valve 1. Annular channels 13 are provided around the inner face of the housing between the inlet port 3 and each group of radially arranged bores 12. These annular channels communicate through ducts 14 with a duct 15 communicating with an exhaust port 16.

In the cross-section of the valve shown in Fig. 2, the clearance between the cylindrical member 1 and the cylindrical housing 2 is shown with exaggeration for the purpose of more clearly explaining the operation of the valve according to the invention. In the unloaded condition of the valve, liquid under pressure enters inlet port 3 and passes via the space 17 between the housing 2 and the outer sleeve 5 through the two groups of radially arranged capillary tubes 9 into the radial bores 12 and from thence between the coacting surfaces of the valve 1 and the housing 2 and from thence through the annular channels 13, ducts 14 and 15 to the exhaust port 16. The annular channels 13 serve to isolate the bearing liquid between each annular channel and the adjacent group of radial bores 12 as any leakage of high pressure liquid between valve 1 and housing 2 is exhausted through the annular channels 13. So long as liquid is permitted to flow through the capillary tubes 9, there is a fall in pressure therethrough and the pressure of the bearing liquid between the two connecting faces of valve members 1 and 2 is much lower than the pressure of the liquid at the inlet port 3.

Assuming now that the valve is loaded in a direction to tend to close the outlet of one of the radial bores 12 as indicated at X in FIG. 2, the flow of liquid through the corresponding capillary tube 9 is reduced and hence the pressure drop through the tube is reduced and there is a rapid build up of pressure in the corresponding radial bore 12, that is to say the lowermost bore as viewed in Fig. 2, and this serves to maintain a lubricating film between the valve and housing in spite of the loading of the valve which would otherwise cause excessive static friction resisting angular displacement of the valve.

It will be understood that the narrow gauge tubes 9 are referred to as "capillary tubes" merely as an indication of the order of the width of the bore thereof and not as indicative of the manner in which they function. They serve to transmit oil under pressure from the inlet port 3, or separate inlets if desired, to the bearing surfaces. These tubes can be replaced by narrow bores in the housing member 2 itself or narrow gauge tubes may be connected to the radial bores 12 otherwise than by the plugs 10.

Figure 3:
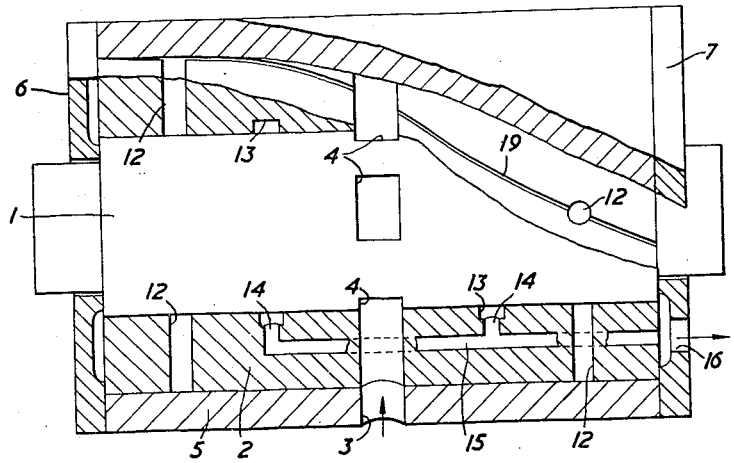
FIG. 3 is a side sectional elevation of a modified form of construction of liquid-flow control valve according to the invention.
Figure 4:
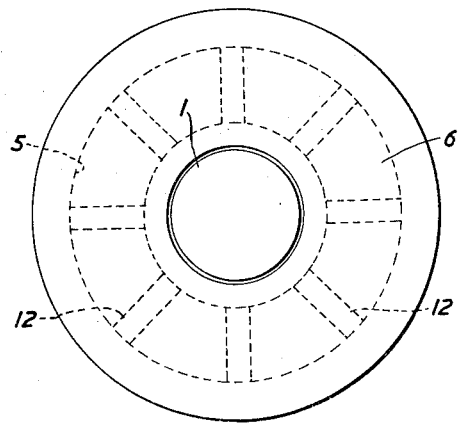
FIG. 4 is an end elevation of the valve illustrated in FIG. 3.

In the modified construction illustrated in FIGS. 3 and 4, the tubes 9 are replaced by narrow helical grooves 19 formed in the surface of the housing 2 and communicating with the inlet port or ports 3 and with the groups of radial bores 12. In this construction the sleeve 5 is shrunk on to the housing 2 as to cover the helical grooves 19 to provide restricted flow paths for the bearing liquid. This modified form of construction of the valve functions in exactly the same way as that illustrated in FIGS. 1 and 2.

I claim:

1. A valve comprising a valve body having a longitudinal bore therethrough, a valve member rotatable in said bore, a fluid inlet passage and a fluid outlet passage extending through said housing and opening into said bore, a transverse fluid flow passage through said valve member and alignable with said inlet and outlet passages in a selected rotated position of said valve member, and means for supporting said valve member is said housing for freedom of rotation including a set of transversely extending radial bores opening into said valve body bore on opposite sides of said inlet and outlet passages, fluid passage means in said valve body extending between said inlet passage and said radial bores for supplying fluid thereto, said fluid passage means including areas of restricted fluid flow whereby the flow of fluid through each of said radial bores is restricted, and fluid collecting means for removing fluid flowing in said longitudinal bore intermediate each set of radial bores and said inlet and outlet passages, said fluid collecting means including annular enlargements of said longitudinal bore, and fluid collecting passages in said valve body extending between said bore enlargements and an outlet point through said valve body.

2. The valve of claim 1 wherein said areas of restricted flow includes a plug in each radial bore, and an elongated tube carried by each plug and extending out through opposite sides thereof.

3. The valve of claim 1 wherein said areas of restricted flow are in the form of a plurality of narrow helical grooves formed in the exterior surface of said valve body, and a sleeve encasing said valve body and sealed thereto adjacent said grooves.

References Cited in the file of this patent

UNITED STATES PATENTS

| | | |
|---|---|---|
| 1,804,693 | Jones | May 12, 1931 |
| 2,049,343 | Warren | July 28, 1936 |
| 2,262,669 | Ellis | Nov. 11, 1941 |
| 2,734,523 | Wiggans | Feb. 14, 1956 |
| 2,845,941 | Wagner | Aug. 5, 1958 |
| 2,955,350 | Gardiner | Oct. 11, 1960 |
| 2,961,004 | Aldinger | Nov. 22, 1960 |

FOREIGN PATENTS

| | | |
|---|---|---|
| 620,628 | Germany | Oct. 24, 1935 |
| 896,233 | France | Apr. 24, 1944 |
| 1,013,566 | France | Apr. 30, 1952 |